United States Patent
Bhamidipaty et al.

(10) Patent No.: US 9,628,551 B2
(45) Date of Patent: Apr. 18, 2017

(54) ENABLING DIGITAL ASSET REUSE THROUGH DYNAMICALLY CURATED SHARED PERSONAL COLLECTIONS WITH EMINENCE PROPAGATION

(71) Applicant: International Business Machines Corporation, Armonk, NY (US)

(72) Inventors: Anuradha Bhamidipaty, Bangalore (IN); Saiprasad Kolluri Venkata Sesha, Bengaluru (IN); Gopal S. Pingali, Mohegan Lake, NY (US); Mark E. Podlaseck, Kent, CT (US); Karthik Sivakumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 14/307,809

(22) Filed: Jun. 18, 2014

(65) Prior Publication Data

US 2015/0373064 A1     Dec. 24, 2015

(51) Int. Cl.
*G06Q 10/10* (2012.01)
*G06Q 50/00* (2012.01)
*H04L 29/08* (2006.01)

(52) U.S. Cl.
CPC ........... *H04L 67/10* (2013.01); *G06Q 10/101* (2013.01); *G06Q 50/01* (2013.01);
(Continued)

(58) Field of Classification Search
CPC ...... G06Q 10/101; G06Q 50/10; H04L 67/10; H04L 67/1095; H04L 67/306; H04L 67/1063
See application file for complete search history.

(56) References Cited

U.S. PATENT DOCUMENTS

| | | |
|---|---|---|
| 7,895,563 B2 | 2/2011 | Carlson et al. |
| 8,244,596 B2 * | 8/2012 | Klinger ............. G06Q 30/0601 705/26.1 |

(Continued)

FOREIGN PATENT DOCUMENTS

| | | |
|---|---|---|
| CA | 2308592 | 11/2001 |
| WO | WO0052590 | 9/2000 |

(Continued)

OTHER PUBLICATIONS

Walsh et al., Dynamic Contextual Usage Metadata for Learning Resource Reuse in Adaptive Environments, IEEE IRI 2011, Aug. 3-5, 2011, Las Vegas, Nevada, 978-1-4577-0966-1/11, pp. 474-479.

(Continued)

*Primary Examiner* — Patrice Winder
(74) *Attorney, Agent, or Firm* — Schmeiser, Olsen & Watts, LLP; John Pivnichny

(57) ABSTRACT

A method and associated systems for reusing digital assets and automatically updating user and asset eminence values associated with each asset reuse. Users each control a collection of digital assets and each user and each asset is assigned an eminence value that represents a relative importance of a user or asset. When a first user accesses an asset, that asset is copied to the first user's collection. When a second user accesses the first user's copy, the asset is copied to the second user's collection, and the eminence of the first user and of the asset are increased. When a third user accesses the second user's copy, the asset is copied to the third user's collection and first-user's, second-user's, and asset's eminence values increase. The second user may automatically locate an asset in the first user's collection by "following" the first user.

17 Claims, 5 Drawing Sheets

(52) U.S. Cl.
CPC ...... *H04L 67/1063* (2013.01); *H04L 67/1095* (2013.01); *H04L 67/306* (2013.01)

(56) References Cited

U.S. PATENT DOCUMENTS

| | | | |
|---|---|---|---|
| 8,341,745 B1 | 12/2012 | Chau et al. | |
| 8,539,086 B2 * | 9/2013 | Mallet | G06Q 50/01 370/328 |
| 8,635,220 B2 | 1/2014 | Garthwaite et al. | |
| 9,258,264 B1 * | 2/2016 | Shoham | H04L 51/32 |
| 2005/0171965 A1 | 8/2005 | Fujimoto et al. | |
| 2006/0053171 A1 | 3/2006 | Eldridge et al. | |
| 2006/0053172 A1 | 3/2006 | Gardner et al. | |
| 2007/0067271 A1 * | 3/2007 | Lu | G06Q 10/10 |
| 2009/0100068 A1 | 4/2009 | Gauba et al. | |
| 2010/0333067 A1 | 12/2010 | Goh et al. | |
| 2012/0117484 A1 | 5/2012 | Convertino et al. | |
| 2012/0311081 A1 * | 12/2012 | Robbin | G06F 17/30194 709/217 |
| 2013/0042263 A1 * | 2/2013 | Reynolds | G06Q 30/0207 725/23 |
| 2013/0066706 A1 * | 3/2013 | Wu | G06Q 50/01 705/14.42 |
| 2013/0066711 A1 * | 3/2013 | Liyanage | G06Q 50/01 705/14.43 |
| 2013/0086170 A1 * | 4/2013 | Skelton | G06Q 50/01 709/204 |
| 2013/0091214 A1 * | 4/2013 | Kellerman | G06Q 10/00 709/204 |
| 2013/0238649 A1 | 9/2013 | Shum | |
| 2013/0318005 A1 * | 11/2013 | Bass | G06Q 50/01 705/36 R |
| 2014/0006176 A1 * | 1/2014 | Gudlavenkatasiva | G06Q 30/02 705/14.73 |
| 2014/0229488 A1 * | 8/2014 | Arngren | G06F 17/30864 707/741 |
| 2015/0106444 A1 * | 4/2015 | Schneider | G06F 17/30772 709/204 |

FOREIGN PATENT DOCUMENTS

| | | |
|---|---|---|
| WO | WO0073893 | 12/2000 |
| WO | WO2007006129 | 1/2007 |
| WO | WO2007064992 | 6/2007 |
| WO | WO 2007/117448 A2 * | 10/2007 |
| WO | WO2007139999 | 12/2007 |
| WO | WO2008008448 | 1/2008 |
| WO | WO2009094086 | 7/2009 |
| WO | WO 2010/123264 A2 * | 10/2010 |
| WO | WO2011005931 | 1/2011 |
| WO | WO 2011/146696 A1 * | 11/2011 |
| WO | WO 2012/057997 A1 * | 5/2012 |
| WO | WO2012067889 | 5/2012 |
| WO | WO2012102863 | 8/2012 |
| WO | WO2012112607 | 8/2012 |

OTHER PUBLICATIONS

Authors: Disclosed Anonymously, System for real-time recommendation of reusable architectural/design assets, ip.com, IP.com No. IPCOM000220540D, Ip.com Electronic Publication: Aug. 6, 2012, 3 pages.

* cited by examiner

US 9,628,551 B2

ENABLING DIGITAL ASSET REUSE THROUGH DYNAMICALLY CURATED SHARED PERSONAL COLLECTIONS WITH EMINENCE PROPAGATION

TECHNICAL FIELD

The present invention relates to identifying, characterizing, and enabling reuse of digital assets.

BACKGROUND

Users of digital resources frequently create digital assets, such as word-processor documents, video files, audio files, spreadsheets, computer programs, Web sites, databases, digital photographs, text messages, online social-media feeds, address books, flow charts, graphics, and any of a huge number of other types of useful digital entities.

Creating a digital asset may consume significant time, effort, or other resources, so it can be more efficient to reuse all or part of an existing asset, rather than creating one from scratch. But it may be difficult for a user to identify, evaluate, or access such an existing asset in a multi-user environment like a business's computer network, a cloud-computing environment, or a social-media network.

BRIEF SUMMARY

One embodiment of the present invention provides a method for enabling digital asset reuse, the method comprising:

a processor of a computer system detecting that a first user has used a digital asset,
  wherein the first user is associated with a first user-eminence value that represents a relative importance of the first user, and
  wherein the digital asset is associated with an asset-eminence value that represents a relative importance of the digital asset;
the processor, in response to the detecting, automatically creating and adding a first instance of the digital asset to a first collection of digital assets for a purpose of allowing other users to identify and use the digital asset, wherein the first collection is a personal collection of the first user and is accessible by other users without requiring an action of the processor;
the processor further detecting that a second user has identified the first instance of the digital asset, that the second user has requested from the first user access to the first instance of the digital asset in response to the identifying, and that the second user has, upon receiving permission from the first user, subsequently used the first instance, wherein the second user is associated with a second user-eminence value that represents a relative importance of the second user, and;
the processor responding to the further detecting by further automatically creating and adding a second instance of the digital asset to a second collection of digital assets for a purpose of allowing other users to identify and use the digital asset, wherein the second collection is a personal collection of the second user and is accessible by other users without requiring an action of the processor;
the processor revising, as a function of the further detecting, the asset-eminence value and the first user-eminence value, but not the second user-eminence value;
the processor receiving notice that a third user has further identified the second instance of the digital asset, that the third user has requested from the second user access to the second instance of the digital asset in response to the further identifying, and that the third user has, upon receiving permission from the second user, subsequently used the second instance, wherein the third user is associated with a third user-eminence value that represents a relative importance of the third user, and;
the processor automatically creating and adding a third instance of the digital asset to a third collection of digital assets for a purpose of allowing other users to identify and use the digital asset, wherein the third collection is a personal collection of the third user and is accessible by other users without requiring an action of the processor; and
the processor further revising, as a function of the receiving notice, the asset-eminence value, the first user-eminence value, and the second user-eminence value, but not the third user-eminence value.

Another embodiment of the present invention provides a computer program product, comprising a computer-readable hardware storage device having a computer-readable program code stored therein, said program code configured to be executed by a processor of a computer system to implement a method for enabling digital asset reuse, the method comprising:

a processor of a computer system detecting that a first user has used a digital asset,
  wherein the first user is associated with a first user-eminence value that represents a relative importance of the first user, and
  wherein the digital asset is associated with an asset-eminence value that represents a relative importance of the digital asset;
the processor, in response to the detecting, automatically creating and adding a first instance of the digital asset to a first collection of digital assets for a purpose of allowing other users to identify and use the digital asset, wherein the first collection is a personal collection of the first user and is accessible by other users without requiring an action of the processor;
the processor further detecting that a second user has identified the first instance of the digital asset, that the second user has requested from the first user access to the first instance of the digital asset in response to the identifying, and that the second user has, upon receiving permission from the first user, subsequently used the first instance, wherein the second user is associated with a second user-eminence value that represents a relative importance of the second user, and;
the processor responding to the further detecting by further automatically creating and adding a second instance of the digital asset to a second collection of digital assets for a purpose of allowing other users to identify and use the digital asset, wherein the second collection is a personal collection of the second user and is accessible by other users without requiring an action of the processor;
the processor revising, as a function of the further detecting, the asset-eminence value and the first user-eminence value, but not the second user-eminence value;
the processor receiving notice that a third user has further identified the second instance of the digital asset, that the third user has requested from the second user access to the second instance of the digital asset in response to the further identifying, and that the third user has, upon receiving permission from the second user, subsequently used the second instance, wherein the third user is associated with a third user-eminence value that represents a relative importance of the third user, and;

the processor automatically creating and adding a third instance of the digital asset to a third collection of digital assets for a purpose of allowing other users to identify and use the digital asset, wherein the third collection is a personal collection of the third user and is accessible by other users without requiring an action of the processor; and the processor further revising, as a function of the receiving notice, the asset-eminence value, the first user-eminence value, and the second user-eminence value, but not the third user-eminence value.

Yet another embodiment of the present invention provides a computer system comprising a processor, a memory coupled to said processor, and a computer-readable hardware storage device coupled to said processor, said storage device containing program code configured to be run by said processor via the memory to implement a method for enabling digital asset reuse, the method comprising:

the processor detecting that a first user has used a digital asset,
wherein the first user is associated with a first user-eminence value that represents a relative importance of the first user, and
wherein the digital asset is associated with an asset-eminence value that represents a relative importance of the digital asset;

the processor, in response to the detecting, automatically creating and adding a first instance of the digital asset to a first collection of digital assets for a purpose of allowing other users to identify and use the digital asset, wherein the first collection is a personal collection of the first user and is accessible by other users without requiring an action of the processor;

the processor further detecting that a second user has identified the first instance of the digital asset, that the second user has requested from the first user access to the first instance of the digital asset in response to the identifying, and that the second user has, upon receiving permission from the first user, subsequently used the first instance, wherein the second user is associated with a second user-eminence value that represents a relative importance of the second user, and;

the processor responding to the further detecting by further automatically creating and adding a second instance of the digital asset to a second collection of digital assets for a purpose of allowing other users to identify and use the digital asset, wherein the second collection is a personal collection of the second user and is accessible by other users without requiring an action of the processor;

the processor revising, as a function of the further detecting, the asset-eminence value and the first user-eminence value, but not the second user-eminence value;

the processor receiving notice that a third user has further identified the second instance of the digital asset, that the third user has requested from the second user access to the second instance of the digital asset in response to the further identifying, and that the third user has, upon receiving permission from the second user, subsequently used the second instance, wherein the third user is associated with a third user-eminence value that represents a relative importance of the third user, and;

the processor automatically creating and adding a third instance of the digital asset to a third collection of digital assets for a purpose of allowing other users to identify and use the digital asset, wherein the third collection is a personal collection of the third user and is accessible by other users without requiring an action of the processor; and the processor further revising, as a function of the receiving notice, the asset-eminence value, the first user-eminence value, and the second user-eminence value, but not the third user-eminence value.

DETAILED DESCRIPTION

Users of digital resources frequently create digital assets, such as word-processor documents, video files, audio files, spreadsheets, computer programs, Web sites, databases, digital photographs, text messages, online social-media feeds, address books, flow charts, graphics, and any of a huge number of other types of useful digital entities.

Creating a digital asset may consume significant time, effort, or other resources, so it can be more efficient to reuse all or part of an existing asset, rather than creating one from scratch. But it may be difficult for a user to identify, evaluate, or access such an existing asset in a multi-user environment like a business's computer network, a cloud-computing environment, or a social-media network.

Embodiments of the present invention address this need by allowing and motivating users of a social network or other multi-user electronic communications environment to locate, characterize, and reuse digital assets created by other users.

This is accomplished by assigning "eminence" values to each user and to each digital asset created or used by a user. These eminence values may be associated with incentives intended to motivate users to reuse other users' existing assets, rather than to create new assets from scratch. Assets that are reused more often may be associated with greater eminence. Similarly, a user may gain eminence if an asset created by or made accessible by that user is more often reused by other users.

Embodiments of the present invention may further facilitate a user's ability to locate an appropriate asset by means of metadata or other characterizing information that identify a characteristic of an asset or of a user associated with the asset. In some embodiments, an "affinity" may associate users or assets that share common or otherwise-desirable attributes or characteristics, and such an affinity may be used to locate a particular type of asset.

Embodiments may further comprise mathematical formulas for adjusting asset eminence and user eminence as a function of asset access or reuse. Some embodiments may further comprise a "decay" function, wherein adjustment of an eminence value is a function of a number of times an asset has been reused, of a number of generations of reuse of an asset, or of a time of usage.

These embodiments will be described in greater detail in FIGS. 1-5. The present invention should not be construed to be limited to the embodiments described herein, nor should it be construed to be limited to a social-networking environment. The present invention may be implemented in any environment or platform in which multiple users may use and share assets, including, but not limited to, a networked workgroup, an enterprise computer network, a cellular network, a Web site, and a mobile-device application.

Figure 1:
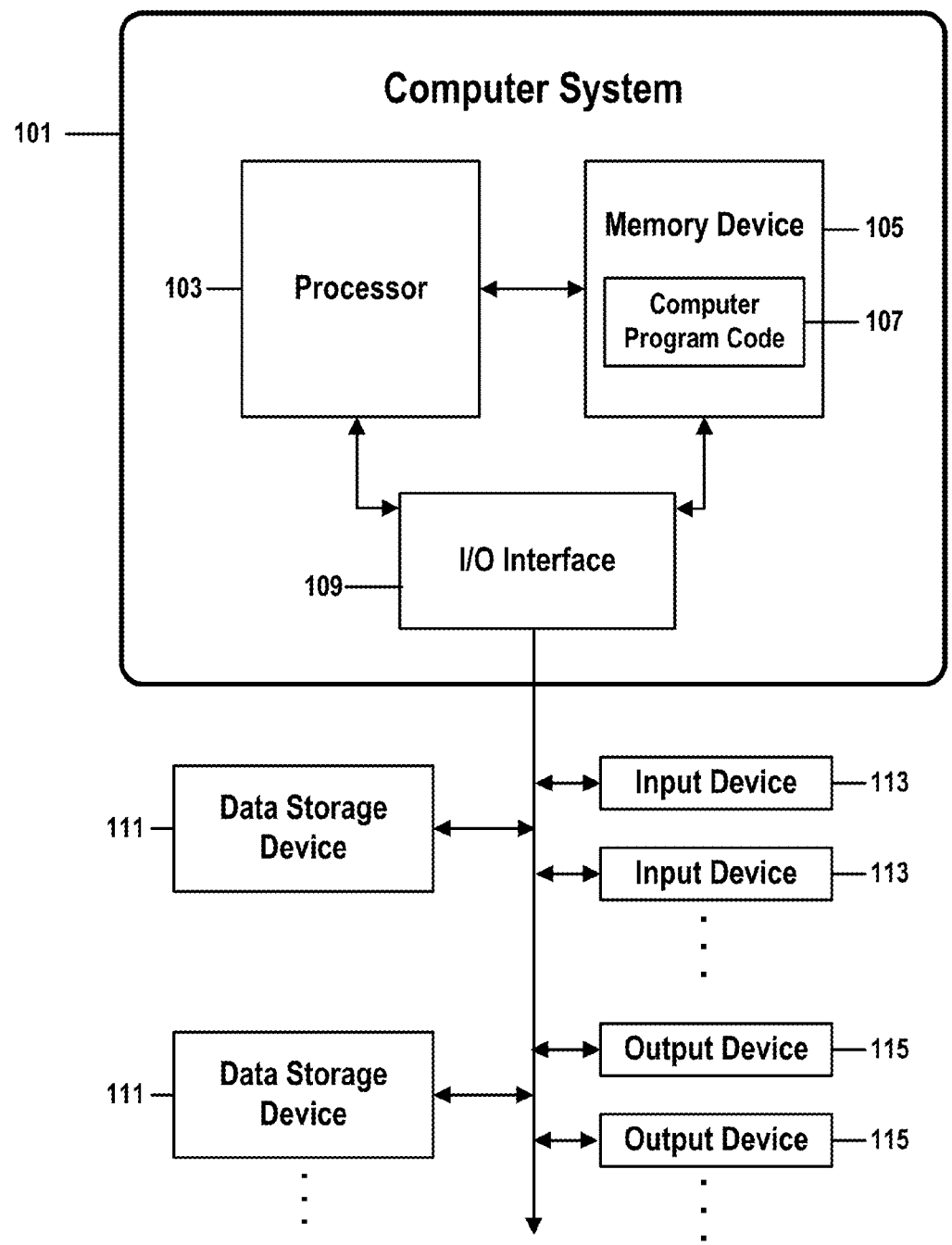
FIG. 1 shows the structure of a computer system and computer program code that may be used to implement a method for enabling digital asset reuse through dynamically curated shared personal collections with eminence propagation in accordance with embodiments of the present invention.

FIG. 1 shows a structure of a computer system and computer program code that may be used to implement a method for enabling digital asset reuse through dynamically curated shared personal collections with eminence propagation in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for enabling digital asset reuse through dynamically curated shared personal collections with eminence propagation in accordance with embodiments of the present invention, and may implement other embodiments described in this specification, including the methods illustrated in FIGS. 1-5. The data storage devices 111 may store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for enabling digital asset reuse through dynamically curated shared personal collections with eminence propagation.

Any of the components of the present invention could be created, integrated, hosted, maintained, deployed, managed, serviced, supported, etc. by a service provider who offers to facilitate a method for enabling digital asset reuse through dynamically curated shared personal collections with eminence propagation. Thus the present invention discloses a process for deploying or integrating computing infrastructure, comprising integrating computer-readable code into the computer system 101, wherein the code in combination with the computer system 101 is capable of performing a method for enabling digital asset reuse through dynamically curated shared personal collections with eminence propagation.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise said computer-readable hardware storage device.

While it is understood that program code 107 for cross-retail marketing based on analytics of multichannel clickstream data may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for cross-retail marketing based on analytics of multichannel clickstream data is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
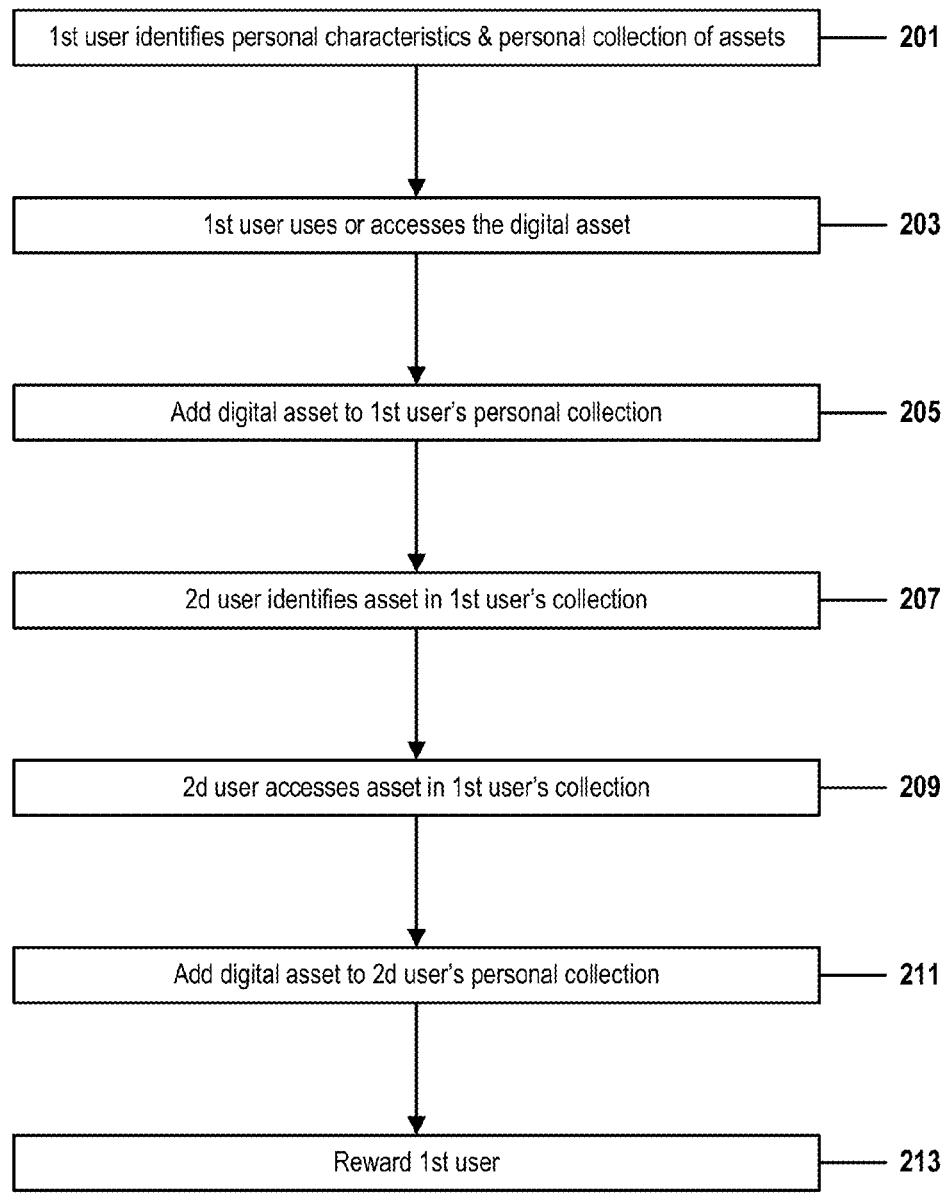
FIG. 2 is a flow chart that overviews a first embodiment of the present invention that enables digital asset reuse by two users through dynamically curated shared personal collections with eminence propagation.

FIG. 2 is a flow chart that overviews a first embodiment of the present invention that enables digital asset reuse by two users through dynamically curated shared personal collections with eminence propagation. FIG. 2 comprises steps 201-213.

In step 201, one or more processors of a computer system allow a first user to identify or characterize itself, to associate itself with a personal collection of digital assets, and to identify or characterize each asset of the personal collection. In some embodiments, each user will be associated with a distinct personal collection of digital assets, and some or all of these collections, or some or all of the assets comprised by these collections, may be stored in a cloud-computing environment. In some embodiments, some or all of these collections, or some or all of the assets comprised by these collections, may be stored on Internet-based storage resources, private intranet-based storage resources, other privately owned storage resources, or combinations thereof.

In some embodiments, the first user may be characterized as a member of a predefined class, such as an evangelist (one who actively promotes use of a certain type of asset, or who promotes some other relevant activity), as an asset creator (an original source of an asset), as a leader (a person who is frequently followed or who is followed by a certain number of other users), or a frequent user of a specific asset or specific type of asset.

In some embodiments, these tasks may comprise a user's manual or automatic associations of itself with specific types of attributes. A user might, for example, associate itself with the user's job function, with a domain of technical expertise (such as marketing, software engineering, or Java Web design), with a personal like or dislike, or with a personal characteristic, such as age, geographical region of residence, or education.

A user may also be associated with a user-eminence value that identifies an importance or prominence of the user within a context relevant to the embodiment. A value of a first user's user-eminence might, for example, be a function of the first user's influence on other users, might indicate a likelihood that the first user's use of a digital asset will result in reuse of that asset by other users, or might be a function of an other characteristic of the first user, as described below.

Similarly, each asset comprised by the user's personal collection may be manually or automatically associated with characteristics or attributes, by means of methods that may be analogous to one or more of the methods by which the user is associated with a characteristic or attribute.

Such characteristics or attributes of an asset may comprise, but are not limited to, a media type of the asset, such as text, graphics, video, audio, streaming audio/visual media, a PowerPoint presentation, a spreadsheet, an interactive form, or an animation; a type of content of the asset, such as financial data, a product demonstration, a news item, a product-installation guide, a business presentation, or a technical solution document that may comprise, but is not limited to, a functional or non-functional requirement, an architecture overview diagram, or a solution-component descriptions; a creation date; a most-recent modification date; or a number of users that have used or reused the asset. Characteristics or attributes may further comprise other types of metadata, such as a file size or creation source, or may comprise keywords found in freeform or structured comments or tags associated with an asset.

In some cases, asset metadata may identify other types of characteristics or attributes of a particular asset, such as a pointer or reference to a user, source, or other asset from which the particular asset acquired or borrowed content, a rating of the asset that may be based in part on the popularity of the particular asset or on eminence of users who access or reuse all or part of the particular asset, miscellaneous tags that describe entities associated with the asset, or freeform notes or comments entered by one or more users. A specific asset may also be associated with metadata that identifies or characterizes a requirement or a class of requirements associated with the specific asset, such as a minimum or maximum requirement for storage capacity or communications bandwidth, or a requirement for previewing, viewing, or updating the requirement by a specific date or time.

In some embodiments, when a particular user adds a new instance of a selected asset to a personal collection, an update and eminence propagation engine or other component of an embodiment of the present invention responds to the adding by automatically associating certain types of metadata with the asset. These certain types may comprise, but are not limited to, an identification of a "parent" instance of the asset from which the new instance was derived or, if the new instance is derived all or in part from more than one asset, an identification of each "parent" instance from which the new instance was derived.

The propagation engine or other component may also associate metadata with the new instance that comprises search criteria by which the particular user located or identified the selected asset. In some embodiments, the propagation engine or other component may also associate metadata with the new instance that comprises metadata associated with each asset or stored asset instance from which the new instance was derived.

When another user accesses and copies the asset associated with the new instance, the propagation engine or other component may automatically propagate some or all of the new instance's metadata to a newly created instance stored in the another user's personal collection.

In some embodiments, if a user manually assigns a personal rating to an asset stored in the user's collection, that personal rating may in a similar way be recorded and propagated as would any other type of metadata associated with an asset.

An asset may also be associated with an asset-eminence value that identifies an importance or prominence of the asset within a context relevant to the embodiment. A value of a first asset's eminence might, for example, be a function of the first asset's frequency of use or reuse, of a number of users who use or reuse the asset, or of a user-eminence of a user that uses or reuses the asset. In such a case, the asset-eminence value might indicate a likelihood that the first user's use of a digital asset will result in reuse of that asset by other assets.

In some embodiments, some or all of these attributes or characteristics, including a user-eminence value and an asset-eminence value, may be initially set to a default value. In other embodiments, some or all of these attributes, characteristics, and eminence values may be assigned values automatically or manually by the user, by the one or more processors, or by other users. In some embodiments, some or all of these attributes, characteristics, and eminence values may be initially left empty, set to zero, or placed in a null state until they are assigned values as a function of other steps of the method of FIG. 2.

In some cases, assets of the first user's personal collection may be stored in a data structure, such as a database, a tree, an other type of hierarchy, or as sets of ordered tuples.

At the conclusion of step 201, the one or more processors will have associated each user with a personal collection of digital assets that is specific to that user. Each user and each asset may have been associated with one or more characteristics or attributes, including a user-eminence value or an asset-eminence value.

In some embodiments, a same digital asset may be comprised by more than one user's personal collection. In such cases, each personal collection may comprise a distinct instance of that same digital asset. In one example, a first user's personal collection may comprise 125 digital assets, including a video tour of the first user's manufacturing operation; and a second user's personal collection may comprise six digital assets, including the same video tour. Here, the first user's personal collection may be said to comprise a first instance of the video tour and the second user's personal collection may be said to comprise a second instance of the video tour. Because a digital asset may be associated with only one asset-eminence value, both instances would be associated with a same asset-eminence value.

In step 203, the one or more processors detect that the first user has identified, used, or otherwise accessed a first asset. Here, the first asset may comprise any sort of digital content or other entity that may be managed by an embodiment of the present invention. The first user may locate or identify the first asset by any technique, tool, method, or technology known to those skilled in the art. This location or identification may, for example, be performed by using a feature of the present invention, by performing a search engine search or a database query, by creating the asset from scratch, or by combining all or part of one or more existing assets.

In some embodiments, the location or identification may be performed by means of a contextual search, wherein the user searches for assets by identifying contextual parameters, conditions, attributes, characteristics, or other criteria that are more complex than simple search keywords. Such contextual criteria may, for example, comprise combinations of business requirements, characteristics related to resource-utilization, computing platform, or other functional or non-functional criteria known to those skilled in the art.

In some embodiments, the location or identification may be performed by identifying users associated with assets, thresholds or ranges of user-eminence or asset-eminence values, or other combinations of characteristics or attributes of users, assets, extrinsic conditions or other search criteria.

In some embodiments, an asset-alert engine may automatically alert a user when certain conditions occur or when certain types of assets become available or change in some way. An asset-alert engine may, for example, allow a user to self-designate itself as "following" a specific asset or user, or as "following" a requirement, attribute, or other characteristic of an asset or user. Such self-designation may, for example, indicate that a user wishes to be notified of any creation, deletion, or change to a followed asset, to assets associated with a followed user, to assets that satisfy a followed requirement, or to assets that are associated with a followed attribute.

In such cases, the asset-alert engine may store information about a following user and the entities that the user is following in an asset-alert or asset-change database. The asset-alert engine would then track and record to the database changes or revisions made to a followed user, asset, or requirement.

In some embodiments, if the asset-alert engine detects a change or revision, the engine would then notify all following users of the change or revision. In some cases, the engine might also automatically present the following users with metadata associated with the revised entities, or might automatically present a preview of the revised assets to the following user.

In step 205, the one or more processors add or copy a first instance of the first asset to the first user's personal collection. As will be described in subsequent figures, the processors may in this step also adjust the first user's user-eminence value or the first asset's asset-eminence value as a function of the first user's use or access of the first asset.

In some embodiments, the one or more processors automatically create an association between the first user and the first asset when this adding or copying occurs. Such an association may indicate that the first user is "following" the first asset or has an affinity with the first asset, or that the first user "likes" the first asset.

Such an association may be used by embodiments of the present invention to automatically associate the first asset with the first user. In one example, if a second user has followed the first user, the second user may automatically be notified of changes to the first asset because of an existence of such an association between the first user and the first asset. In another example, if a second user's search for assets that have a particular characteristic identifies the first asset, the second user might be further identified of a possibility that similar assets might be found in the first user's personal collection.

In some embodiments, all or part of step 205 may be performed before step 203. In such an embodiment, the one or more processors may add an instance of the first asset to the first user's personal collection before the first user uses the first asset. In other cases, the one or more processors may add an instance of the first asset to the first user's personal collection before the first user uses all or part of the first asset, but after the first user has searched, located, identified, retrieved, examined, displayed, or otherwise previewed the asset.

In step 207, the one or more processors detect that a second user has identified the first instance of the first asset in the first user's personal collection. The second user may locate or identify the first instance by any technique, tool, method, or technology known to those skilled in the art.

Embodiments of the present invention may, for example, allow the second user to identify the first instance by means of a contextual search based, for example, on a personal interest of the second user or on an other characteristic of the second user. In another example, the identification may have been a result of the second user being automatically alerted to the first user's creation of or use of the first asset because either the first user or the second user has established an affinity between the two users. Such an affinity may be a function of one of the two users' self-identification as a "follower" of the other user, or it may be a function of common characteristics or attributes shared by the two users.

In yet another example, the identification may have been a result of an automatic notification configured by the second user that automatically alerts the second user of a creation of or a use of an asset that meets certain criteria or that is associated with a certain set of attributes or characteristics.

In some embodiments, the second user may identify the second asset by filtering a set of search or query results by any of the criteria described above, or by any other method known to those skilled in the art. Such filtering criteria may comprise, but are not limited to: a requirement associated with the second user; an identity of or a characteristic of a user, including a "following" designation, whose personal collection comprises an instance of a digital asset; a range of asset-eminence values of an asset; a range of user-eminence values of an asset or of a user whose personal collection comprises an instance of an asset; or a rating based on any of these criteria.

In some embodiments, the one or more processors may, for example, automatically notify the second user when a user that the second user is following has created or used an asset. In another example, the one or more processors might automatically notify the second user when any asset associated with one or more characteristics "followed" by the second user is created, copied, used, reused, or otherwise accessed by another user.

In some embodiments, the one or more processors may, automatically notify the second user if the first user makes any change to any asset of the first user's personal collection. In some cases, such an automatic notification may be performed only if the second user has self-identified itself as a follower of the first user.

In some embodiments, the one or more processors, in addition to, or instead of, allowing the second user to follow another user or a requirement, may allow the second user to follow a specific asset. In such cases, the one or more processors may automatically notify the second user whenever an instance of a followed asset is accessed, used, copied, updated, deleted, moved, or otherwise affected or altered in a way specified by the "following" second user.

The second user might, for example, search for all digital assets related to manufacturing facilities associated with users whom the second user follows. If this search returns 1200 assets, the second user might then filter the results so as to identify only those assets that: i) are stored in a personal collection of a user whom the second user is following; ii) are video files; and iii) have an asset-eminence value that exceeds a certain threshold.

In another example, if the second user is following a digital asset that comprises a spreadsheet-program worksheet, one instance of which is stored in a first user's personal collection, then the one or more processors may automatically notify the second user whenever the first user edits or otherwise updates the followed worksheet.

In step 209, the one or more processors detect that the second user has accessed or reused the first asset. This accessing or reuse may comprise any sort of activity deemed relevant to the embodiment or implementation of the present invention.

In one example, if the second user had in step 207 identified an audio file comprised by the first user's collection, the one or more processors might detect in step 209 that the second user had, subsequent to identifying the audio file, reused the audio file as a soundtrack to a streaming-video asset created by the second user.

In other variations of this example, the one or more processors might instead detect in step 209 that the second user had accessed the audio file by playing a first part of the file, by downsampling the file or converting it from stereo to mono in order to reduce its storage requirements, or by forwarding an excerpt to a third user. In some embodiments, a reuse may occur only if the second user copies, alters, displays, or incorporates all or part of the file in a new asset. In other embodiments a reuse may also occur if the user merely examines metadata associated with the asset, but decides not to further access the asset in any way. Such a metadata examination might comprise tasks like retrieving the asset's creation date and size or viewing a thumbnail representation of content of the asset.

In some embodiments, all or part of step 211 may be performed before step 209. In such an embodiment, the one or more processors may add an instance of the first asset to the second user's personal collection before the second user reuses the first asset. In other cases, the one or more processors may add an instance of the first asset to the second user's personal collection before the second user reuses all or part of the first asset, but after the second user has searched, located, identified, retrieved, examined, displayed, or otherwise previewed the asset.

In step 211, the one or more processors automatically create a second instance of the first asset in response to the second user's identification or access of the asset in step 209. The processors then add this second instance to the second user's personal collection, where it may be located or identified by other users. Here, the second instance and the first instance will share a common asset-eminence value if the two instances comprise identical content.

In some embodiments, the one or more processors automatically create an association between the second user and the first asset when this adding or copying occurs. Similar to the analogous function described for the first user in step 205, such an association may indicate that the second user is "following" the first asset or has an affinity with the first asset, or that the second user "likes" the first asset.

In some embodiments, if the second user's reuse of the first asset has altered the first asset or reused only part of the first asset, the one or more processors may store an instance of the second user's altered asset in the second user's collection as an instance of a new asset distinct from the first asset. In some cases, the processors may store in the second user's collection both the instance of the new, altered asset and a new instance of the original first asset.

In step 213, the one or more processors may adjust the first user's user-eminence value and the first asset's asset-eminence value in response to the second user's identification or access of the asset. In some embodiments, this step may occur in step 209 or step 211.

Such updating may be a function of an asset-eminence value of the first asset, of a user-eminence value of the first user, or of a user-eminence value of the second user. Examples of such a function are described in more detail in FIGS. 4-5.

In some embodiments, the one or more processors may perform this adjusting as a further function of a time at which or a manner in which the second user identifies or accesses the first asset. In one example, if the first instance of the first asset, stored in the first user's personal collection, is accessed by 10 users over a period of a year, then the eminence of the first user resulting from each access is increased by a smaller amount each time another access occurs. Such a decay function ascribes a greater value to accesses that occur closer to the time of the asset's initial addition to the first user's personal collection.

Other types of decay functions are possible. The amount of adjustment of the first user's eminence value may, for example, be increased or decreased as a function of how many users have already accessed the instance of the first asset stored in the first user's collection. In another example, if multiple generations of users successively reuse an asset, an increase to the first user's user-eminence value resulting from each asset decreases with each generation. This decay function is described in greater detail in FIG. 3.

In some embodiments, the one or more processors may adjust the first asset's asset-eminence value as a further function of a characteristic or attribute of the first user or of the second user. In some embodiments, for example, if the second user has a higher user-eminence value, the eminence value of the first user or of the first asset might be increased by a greater amount. In another example, if the second user belongs to a more prominent or more prestigious class, such as evangelist, the eminence value of the first user or of the first asset might be increased by a greater amount.

At the conclusion of step 213, the one or more processors, in response to detecting the second user's reuse of an asset in the first user's personal collection, will have copied the first asset to the second user's collection and will have adjusted the eminence value of the first user and the eminence value of the first asset.

The amount of this adjustment may be a function of characteristics of the first user, of the second user, of the first asset, and of the time and manner of the second user's reuse. More important or more relevant reuses may result in greater eminence increases.

Figure 3:
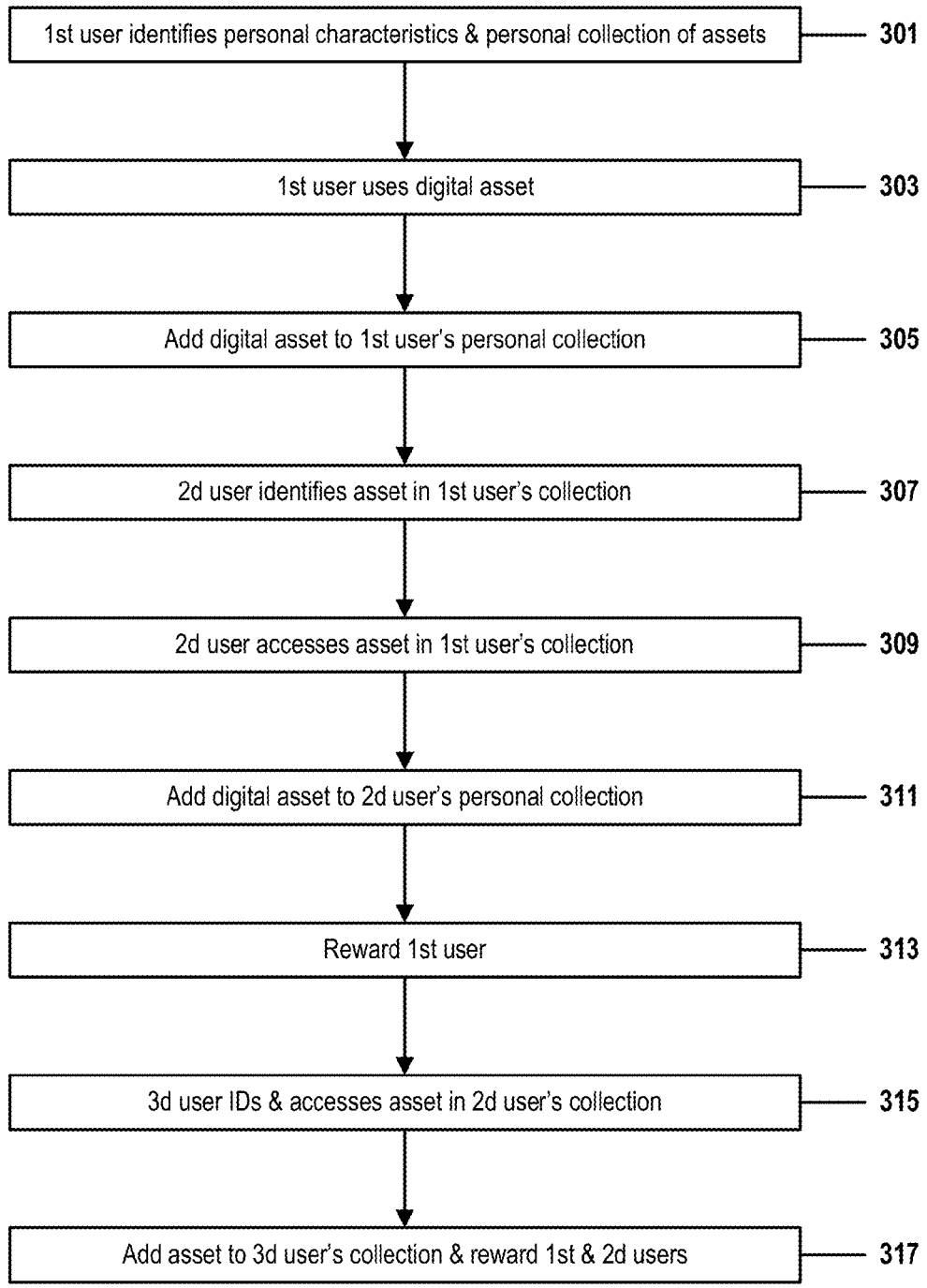
FIG. 3 is a flow chart that overviews a second embodiment of the present invention that enables digital asset reuse by more than two users through dynamically curated shared personal collections with eminence propagation.

FIG. 3 is a flow chart that overviews a second embodiment of the present invention that enables digital asset reuse by more than two users through dynamically curated shared personal collections with eminence propagation. FIG. 3 comprises steps 301-319.

Steps 301-313 of FIG. 3 are identical to respective steps 201-213 of FIG. 2. In order to increase readability and conserve space, the above descriptions of steps 201-213, which also describe steps 301-313, are not duplicated here.

In step 315, the one or more processors detect that a third user has identified and accessed or reused the second instance of the first asset in the second user's personal collection. Similar to the manner in which the second user in step 207 located or identified the first instance in the first user's personal collection, the third user here may locate or identify the second instance by any technique, tool, method, or technology known to those skilled in the art.

Like the first user and the second user, the third user is associated with a set of characteristics or attributes, including a third user-eminence value. Some or all of these characteristics, attributes, and user-eminence values may be analogous or similar to the characteristics, attributes, and user-eminence values of the first user and second user, as described above in the description of step 201. Furthermore, the third user's characteristics, attributes, and user-eminence may be identified, assigned a value, or otherwise manipulated, used, or managed in a manner similar or identical to the manner in which the same operations may be performed upon the first user's characteristics, attributes, and user-eminence.

Other tasks performed in step 315 are analogous to those described in steps 207-209. For example, embodiments of the present invention may allow the third user to identify the second instance by means of a contextual search based, or as a result of the third user being automatically alerted to the second user's creation of or use of the first asset, or because the second user or the third user has identified an affinity between the two users, such as a common interest or a following/follower relationship shared by the two users.

As described above, the one or more processors may also allow the third user to more precisely locate or identify the second asset by filtering a set of search or query results by any criteria relative to the embodiment of FIG. 3.

In some embodiments, the one or more processors, in addition to, or instead of, allowing the third user to follow another user or a requirement, may also allow the third user to identify a specific asset to follow. In such cases, the one or more processors may automatically notify the third user whenever an instance of a followed asset is accessed, used, copied, updated, deleted, moved, or otherwise affected or altered in a way specified by the "following" third user.

In some embodiments, all or part of step 205 may be performed before step 203. In such an embodiment, the one or more processors may add an instance of the first asset to the third user's personal collection before the third user uses the first asset. In other cases, the one or more processors may add an instance of the first asset to the third user's personal collection before the third user uses all or part of the first asset, but after the third user has searched, located, identified, retrieved, examined, displayed, or otherwise previewed the asset.

In step 317, the one or more processors, in a procedure analogous to that of step 211 of FIG. 2, automatically create a third instance of the first asset in response to the third user's identification, reuse, or other access of the second instance of the first asset in step 309. The one or more processors then, in a procedure analogous to that of steps 211 and 213 of FIG. 2, add this third instance to a third personal collection of digital assets associated with the third user, where it may be located or identified by other users, and reward the first user by adjusting the first user's user-eminence value.

In some embodiments, the one or more processors automatically create an association between the third user and the first asset when this adding or copying occurs. Similar to the analogous function described for the first user in steps 205 and 211, such an association may indicate that the third user is "following" the first asset or has an affinity with the first asset, or that the third user "likes" the first asset.

The third personal collection is similar to the personal collections of the first and second users, comprising types of digital assets that may be similar to types of digital assets comprised by the first and second users' personal collections, as described above. The digital assets comprised by the third user's personal collection may be further associated with metadata characteristics, attributes, and asset-eminence values similar to those associated with assets comprised by the first and second users' personal collections, as described above. In particular, the newly created third instance will share a common asset-eminence value with the first instance and the second instance, so long as the two instances comprise identical content.

In a manner similar to that of step 213, the one or more processors may adjust the first user's user-eminence value or the first asset's asset-eminence value in response to the third user's identification, reuse, or other access of the second instance of the first asset. Such updating may be a function of the first asset's asset-eminence value, of the first user's user-eminence value, of the second user's user-eminence value, or of the third user's user-eminence value. Such a function is described in more detail in FIGS. 4-5.

In some embodiments, as explained in the description of step 213, the one or more processors may perform this adjusting as a further function of a time at which or a manner in which the third user identifies or accesses the first asset.

In some embodiments, one class of decay function may adjust the first user's eminence value by a greater amount when another users accesses an instance of the first asset that is associated through fewer generations of reuse with the instance in the first user's collection. In the embodiment of FIG. 3, for example: the first user's user-eminence value might be increased by a first amount when the second user accesses the first instance of the first asset stored in the first user's collection; the first user's user-eminence value might be increased by a second amount when the third user accesses the second instance of the first asset stored in the second user's collection; and the first user's user-eminence value might be increased by a third amount when a fourth user accesses a third instance of the first asset stored in the third user's collection.

In this example, the second user's access might be deemed a first-generation access of the first-user's personal collection because the second user accesses an asset instance that is actually stored in the first user's collection. Similarly, the third user's access might be deemed a second-generation access of the first-user's personal collection because the third user accesses an asset instance, stored in the second user's collection, that is one generation removed from the instance stored in the first user's collection. And the fourth user's access might be deemed a third-generation access of the first-user's personal collection because the fourth user accesses an asset instance, stored in the third user's collection, that is two generations removed from the instance stored in the first user's collection.

In this example, if all other things are equal, a decay function might set the first amount of adjustment to be greater than the second amount of adjustment and further set the second amount of adjustment to be greater than the third amount of adjustment. In other words, the first user would be rewarded with a greater increase in eminence when another user directly accesses the first user's collection, but the first user would then be rewarded with a lesser increase when yet another user accesses an instance of an asset that was directly or indirectly copied from an instance in the first user's collection.

In addition to rewarding the first user by increasing the first user's user-eminence value, the one or more processors in step 317 may also reward the second user by increasing the second user's user-eminence value. This rewarding may be performed in a manner similar to that described in step 213.

In some embodiments, the second user's reward may be greater than the first user's reward in step 317 because the third user directly accessed the second user's collection in step 315, but only indirectly, through an additional generation of reuse and copying, accessed the first user's collection in step 315.

In other embodiments, the first user's reward may be greater than the second user's reward because the second instance of the first asset stored in the second user's collection is a mere copy of a source instance stored in the first user's collection.

In yet other embodiments, these factors may not, or may not always, affect the amounts of the rewards, or the relative amounts of reward, awarded to the first and second users as a result of the third user's access of the second instance of the asset.

In some embodiments, the one or more processors may adjust the asset-eminence value of the first asset in response to the adjustments to the third user's access of the second instance of the asset in step 317. As with the user-eminence adjustments, this adjustment to the asset-eminence value may be a function of a number of generations of reuse or copying that separate an instance that was actually accessed and an instance associated with another user whose personal characteristics or attributes may affect an amount of adjustment of the asset's asset-eminence value.

Figure 4:
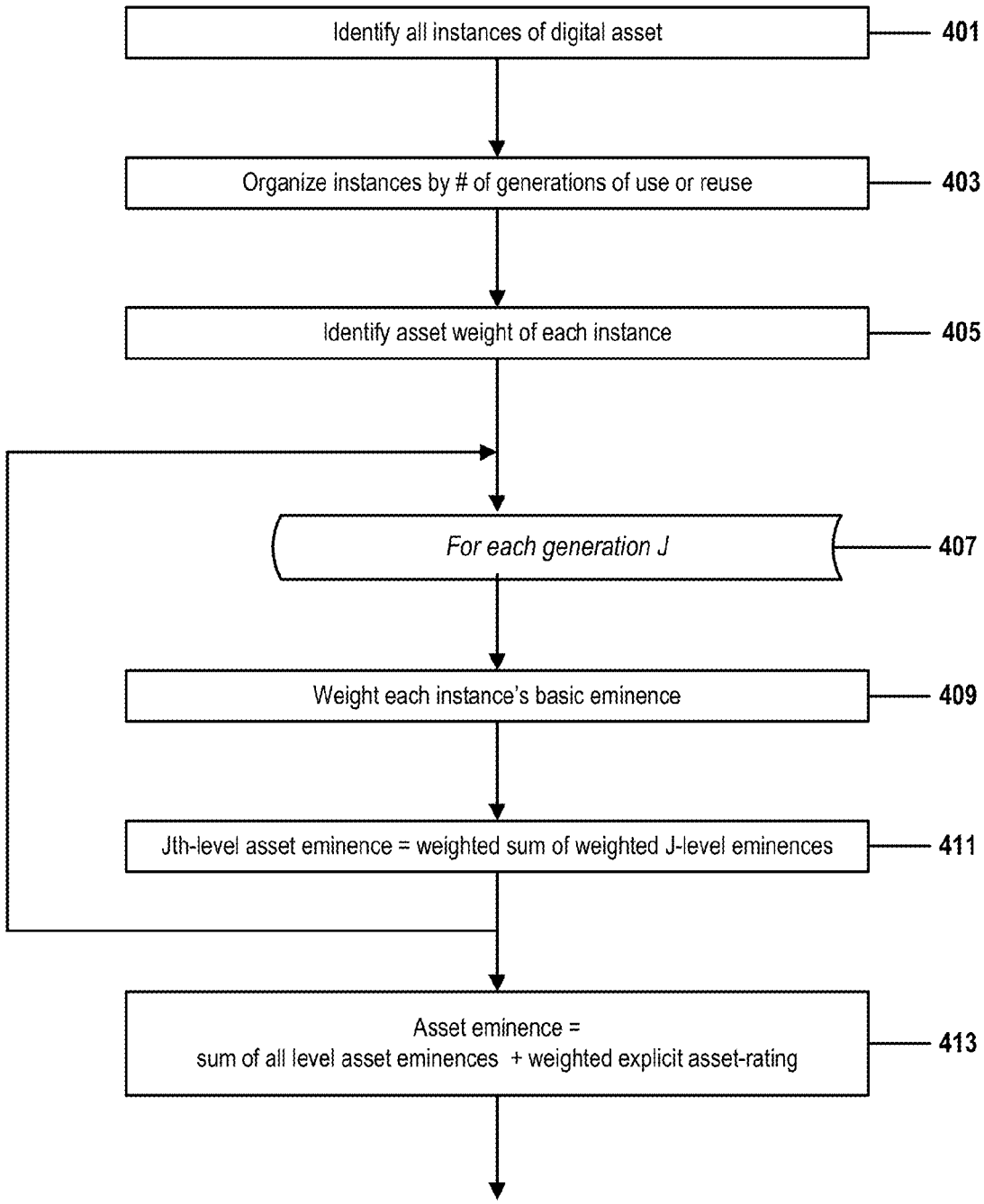
FIG. 4 is a flow chart that illustrates a method of deriving an asset-eminence value associated with a digital asset in accordance with embodiments of the present invention.

FIG. 4 is a flow chart that illustrates a method of deriving an asset-eminence value associated with a first digital asset in accordance with embodiments of the present invention. FIG. 4 comprises steps 401-413.

FIG. 4 provides greater detail to tasks described in step 213 of FIG. 2 and steps 313 and 317 of FIG. 3. In some embodiments, the one or more processors may also use the method of FIG. 4 to derive, initialize, or adjust an asset-eminence value associated with a digital asset stored in a user's personal collection when performing other tasks comprised by or related to the embodiment.

As explained above, in embodiments of the present invention described herein, one or more processors associate each digital asset stored in a user's personal collection with an asset-eminence value specific to that asset. Embodiments of the present invention further associate each user with a distinct user-eminence value specific to that user. Higher eminence values may indicate greater prominence, status, or importance and an increase to a user's user-eminence value or to an asset-eminence value of an asset stored in the user's personal collection is thus desirable to the user.

In embodiments of the present invention, an asset that is accessed or reused more often or by a greater number of users may have a greater asset-eminence value. Similarly, a user whose personal collection comprises a greater number of higher-eminence assets may have a higher eminence value. Similarly, an eminence value of an asset that increases because it was accessed or reused by a particular user may increase by a greater amount if the particular user has a greater eminence value.

In step 401, the one or more processors identify all instances of a first digital asset that are stored in personal collections, wherein each personal collection comprises at most one instance of the first digital asset and wherein each personal collection is associated with one user or one set of users.

Here, each asset instance I is initially associated with a basic eminence value $A_I$. This basic eminence may be associated with instance I as a function of prior asset-eminence computations or may be set manually by a user when the instance is created or updated. In some embodiments, the one or more processors may automatically associate the instance I with a basic eminence that is a function of any of the factors, described above, that may be comprised by an asset-eminence assignment or derivation.

In step 403, the one or more processors sort or order the instances identified in step 401 by a number of generations of reuse. As explained in the description of steps 213 and 317, the first digital asset may be reused by multiple generations of users.

A first user, for example, might locate, access, and use the asset, or an initial instance of the asset, and store a first instance of the asset in a first personal collection. A second user might then copy the first instance into the second user's second personal collection as a second instance, and a third user and a fourth user might next copy the second instance, respectively, into the third user's third personal collection as a third instance and into the fourth user's fourth personal collection as a fourth instance. In such a case, the first digital asset might be deemed to be associated with two generations of reuse, the second instance representing a first generation of reuse and the third and fourth instances representing a second generation of reuse. The one or more processors might thus in step 403 organize the instances into a first group that comprises the first instance, a second group that comprises the second instance, and a third group that comprises the third and fourth instances.

In another embodiment, the one or more processors might interpret the above reusage as comprising three generations of reuse. This might occur, for example, if the first user is deemed to have reused the digital asset. In such a case, the second instance would be deemed to identify a second generation or reuse and the third instance would be deemed to identify a third generation of reuse.

It does not matter which of these two interpretations (or some other system of counting generations) is used for identifying a number of generations of use or reuse of a digital asset, so long as a same method of identifying is consistently used. What is important here is the resulting relative ranking or ordering of instances, such that all instances of all digital assets are organized into groups that each comprise instances associated with a same number of generations of reuse.

In a more concrete example, the one or more processors may in step 403 organize instances of a digital asset identified in step 401 into three groups. Instances in the first group might have never been reused by other users, instances comprised by the second group might have been reused by only one generation of users, and instances comprised by the third group would have been reused by two generations of users.

In this example, an instance comprised by the second group might have been reused by eight first-generation reusers who each copied the second-group instance into his or her own personal collection. But these eight newly copied instances were never reused in turn by a second generation of reusers. Similarly, an instance comprised by the third group might have been reused by six first-generation reusers who each copied the third-group instance into his or her own personal collection, and those six newly copied instances were then, in aggregate, reused by nineteen second-generation reusers who each copied one of the six copied instances into one of the second-generation reusers' personal collections. Hence, in this example, the six instances comprised by the second group are each first-generation copies of the single instance comprised by the first group, and the nineteen instances comprised by the third group are each a second-generation copy of the instance comprised by the first group and a first-generation copy of an instance comprised by the second group.

In some embodiments, the first, second, third group might be described as containing, respectively, first-generation instances, second-generation instances, and third-generation instances of the first digital asset. In some embodiments, the first, second, third group might be described as containing, respectively, first-level instances, second-level instances, and third-level instances of the first digital asset.

Some implementations may comprise a large number of digital assets or a large number of asset instances stored in personal collections. In such cases, manually identifying, characterizing, relating, or organizing assets or instances may consume burdensome amounts of resources. Some embodiments of the present invention, therefore, may maintain an asset database, instance database, or other information repository that identifies each instance of each asset and relates instances that are associated with a common asset. Such entries may also identify attributes of each asset or instance, including an asset-eminence value or identifications of users whose personal collections comprise an instance of a particular asset. These entries might be automatically updated whenever a user creates, identifies, locates, copies, reuses, or otherwise accesses an asset or an instance of an asset. In such cases, all or part of steps 401 and 403 might be performed by means of a database query, a repository search, or an other information-retrieval method known to those skilled in the art.

In some embodiments all instances of all digital assets may be stored in a single aggregated collection that comprises all personal collections of all users. In such an implementation, the assets or instances might logically appear to users as being organized into the personal collections described above.

In step 405, the one or more processors may associate an asset weight with each digital asset or with each instance of each digital asset. In some embodiments, asset weights may not be so associated.

An asset weight may indicate a relative importance of an associated asset or instance. A weight may be derived, initialized, or adjusted according to implementation-dependent parameters, priorities, or conditions, and the exact method of identifying a value of a weight may be performed by means of an implementer's expert knowledge or by means known to those skilled in the art.

A weight $W_I$ associated with an instance I of a first asset, for example, might be assigned a value that is a function of a type T of reuse of instance I, an eminence $E_P$ of a user P who reuses instance I, or a duration of time elapsed since any user most recently reused instance I. Here, a type of reuse of instance I may comprise, but is not limited to, reviewing or previewing instance I, copying instance I to another personal collection, incorporating all or part of instance I into a new asset, or updating or revising the first asset.

In some embodiments, the weight $W_I$ associated with an instance I may be identified as a function of a level or generation reuse associated with instance I. Here, a greater number of generations of reuse might result in a lower weight, resulting in smaller increases to eminence values as a result of more attenuated relationships between instances. In other embodiments, the weight $W_I$ associated with an instance I may be identified as a function of a number of reuses of instance I, resulting in more popular assets, all other things equal, generally having greater asset-eminence values.

In some embodiments a weight may be assigned or adjusted manually by a system designer, implementer, business expert, or other person who possesses expert knowledge of a business, user, asset, or other entity relevant to the embodiment. In other embodiments, a weight may be assigned or adjusted automatically by the one or more processors as a function of a combination of factors similar to those described in this step.

In some embodiments, a weight may be all or in part inherited from a parent instance or may be assigned or adjusted as a function of a weight associated with the parent instance. If, for example, a first instance $I_1$ of a digital asset in a first user's personal collection is copied to a second instance $I_2$ in a second user's personal collection, a weight $W_2$ associated with second instance $I_2$ may be initially set to a value of a weight $W_1$ that had been associated with first instance $I_1$ at the time of the copying. In variations of this example, $W_2$ may be set as a function of the value of $W_1$, such as a function that derives a value of $W_2$ by discounting the value of $W_1$ by a decay factor that associates lower weights with instances that have not been reused for longer periods of time.

At the completion of step 405, the one or more processors will have organized all instances of a first digital asset into a set of groups, wherein each group contains instances that are related to a first instance of the first digital asset by a same number of generations of copying.

Step 407 initiates an iterative process of steps 407-411. This iterative process repeats once for each generation or level J of instances. If, for example, the one or more processors in step 403 organize the instances identified in step 401 into nine groups, each of which comprises instances at a same level of reuse, then the iterative process of steps 407-411 would be performed nine times (with the value J ranging with each iteration from 1 to 9), once for each generation or level of reuse. Each of these nine iterations would identify a Jth-level asset-eminence value associated with the first digital asset and at the conclusion of the ninth iteration, the one or more processors will have identified nine Jth-level asset-eminence values, which will be used in step 413 to determine an overall asset-eminence value for the first digital asset.

In step 409, the one or more processors apply an asset weighting $W_I$, identified in step 405, to each basic asset-eminence value $A_I$ associated with an asset instance I identified in step 401. In the example shown here, this application is a simple multiplication of a basic eminence value by a corresponding weighting.

Thus, for each asset instance I identified in step 401, the one or more processors in step 409 identify a weighted basic asset-eminence value equal to $A_I * W_I$.

In step 411, the one or more processors add the weighted basic asset-eminence values $A_I * W_I$ for all instances I identified in step 401, and then weight the resulting sum by a $J^{th}$-level weighting value $W_J$.

Level-weighting values may be identified by any criteria deemed relevant to the embodiment, such that factors considered less important to an asset's asset-eminence value may exert less of a positive effect on the asset-eminence value that factors deemed more important. Here, $W_J$ may be a factor that discounts a value of a reuse that is associated with a higher number of generations of reuse.

In some embodiments, a level-weighting value may be constrained to two values, one that is associated with a direct reuse of an instance of an asset, and an other that is associated with an indirect (multi-generational) reuse of the instance. In one example of such a level-weighting, an instance associated with level J=2 might be associated with a first level-weighting value and instances associated with all other levels, J>2, would be associated with a second level-weighting value. If the second level-weighting value was less than the first level-weighting value, the resulting embodiment would ascribe greater importance to instances at level 2 than it would to instances that reused a level-2 instance. Other embodiments may comprise variations of this methodology.

In one example, if an instance I spawns a first-generation instance and a second-generation instance, then a $1^{st}$-level weighting value $W_1$ might be assigned a value that is twice a value of a $2^{nd}$-level weighting value $W_2$. This would result the first-generation reuse being a more heavily weighted factor than the second-generation reuse when determining the effects of the reuse on an asset-eminence value.

At the conclusion of step 411 of a Jth iteration of the iterative process of steps 407-411, the one or more processors will thus have determined a sum of weighted basic asset-eminence values of all instances identified in step 401 as being associated with a Jth-level reuse, and will have further weighted that sum by a Jth-level weighting factor. The resulting interim mathematical entity may be expressed as:

$$W_J * \Sigma(W_I * A^I_J),$$

where $A^I_J$ represents a basic asset-eminence value of an $i^{th}$ asset instance associated with the $J^{th}$ level of reuse, where $W_I$ represents an asset-instance weighting value identified in step 405 and associated with the $i^{th}$ asset instance, and $W_J$ represents a $J^{th}$-level weighting value associated with the $J^{th}$ level of reuse.

At the conclusion of the $J^{th}$ iteration of the iterative process of steps 407-411, the one or more processors will have derived a set of J level asset eminences, each of which identifies a doubly weighted asset-eminence value of all instances of the first digital asset that are associated with a particular level or generation of reuse of the first digital asset, wherein each particular level may be a value from 1 through J.

Some embodiments may not identify asset-eminence weighting or a level weighting for one or more levels or for one or more instances of the first digital asset. In such cases, a weighting may be deemed to be unnecessary or incongruent with other requirements or features associated with the embodiment, or may be deemed to be unnecessary in order for the embodiment to operate within desired levels of precision.

In step 413, the one or more processors derive an asset-eminence value $E_A$ of the first digital asset A as a sum of a weighted explicit asset-rating and the J doubly weighted level asset-eminence values derived in the J iterations of the iterative process of steps 407-411.

Here, the weighted explicit user asset-rating may be expressed as a product of an unweighted explicit asset-rating $R_A$ of the first digital asset A and a rating weighting factor $W_R$. In some embodiments, the one or more computers may compute, adjust, or assign values to these two factors as a function of implementation-dependent criteria, and this computation, adjustment, or assignment may be performed automatically by the one or more processors, or manually by an implementer who is skilled in the art or who possesses expert knowledge of the embodiment, its users, or the assets that it manages.

In some embodiments the unweighted explicit user's asset-rating $R_A$ may be initially selected by a user as a function of the user's judgment of a relative importance of the asset. A user may, for example, assign a greater rating to a first asset than to a second asset if the user perceives that the first asset is more important, more useful, or more cost-effective than the second asset. These user asset ratings may be referenced by other users as search criteria when searching for specific assets in search procedures like that of step 203.

In step 413, the one or more processors thus derive the asset-eminence value $E_A$ of the first digital asset A as:

$$E_A = \Sigma(W_J * \Sigma(W_I * A^I_J)) + (W_R * R_A)$$

In some embodiments, $E_A$ may be expressed as either an absolute value, as shown above, or may be translated to an equivalent percentile value or other equivalent representation.

In some embodiments, when an asset-eminence value $E_A$ of a first asset A is created, defined, adjusted, or otherwise associated with the asset A or with an instance $Inst_A$ of the asset A, this asset-eminence value is automatically propagated across some or all other instances of asset A associated with any personal collection comprised by the embodiment.

In some embodiments, this propagation may be limited to all instances among the J levels or generations referenced in the figure above, wherein the instances at each J>1 level have been generated as results of direct or indirect accessing of instance $Inst_A$ at the 1st level.

In other embodiments, this propagation may further extend to other instances of A that are not directly or indirectly derived from $Inst_A$. Such instances may, for example, comprise an instance of asset A from which instance $Inst_A$ was derived (a "parent" or "ancestor" of instance $Inst_A$), or may comprise other instances of asset A that do not share a same branch with $Inst_A$ in a hierarchical representation of parent-child relationships of instances of asset A.

In embodiments of the present invention, any revision to an asset-eminence value of any instance of asset A may result in that revision being automatically propagated to asset-eminence values of all other instances of asset A comprised by any user's personal collection.

Figure 5:
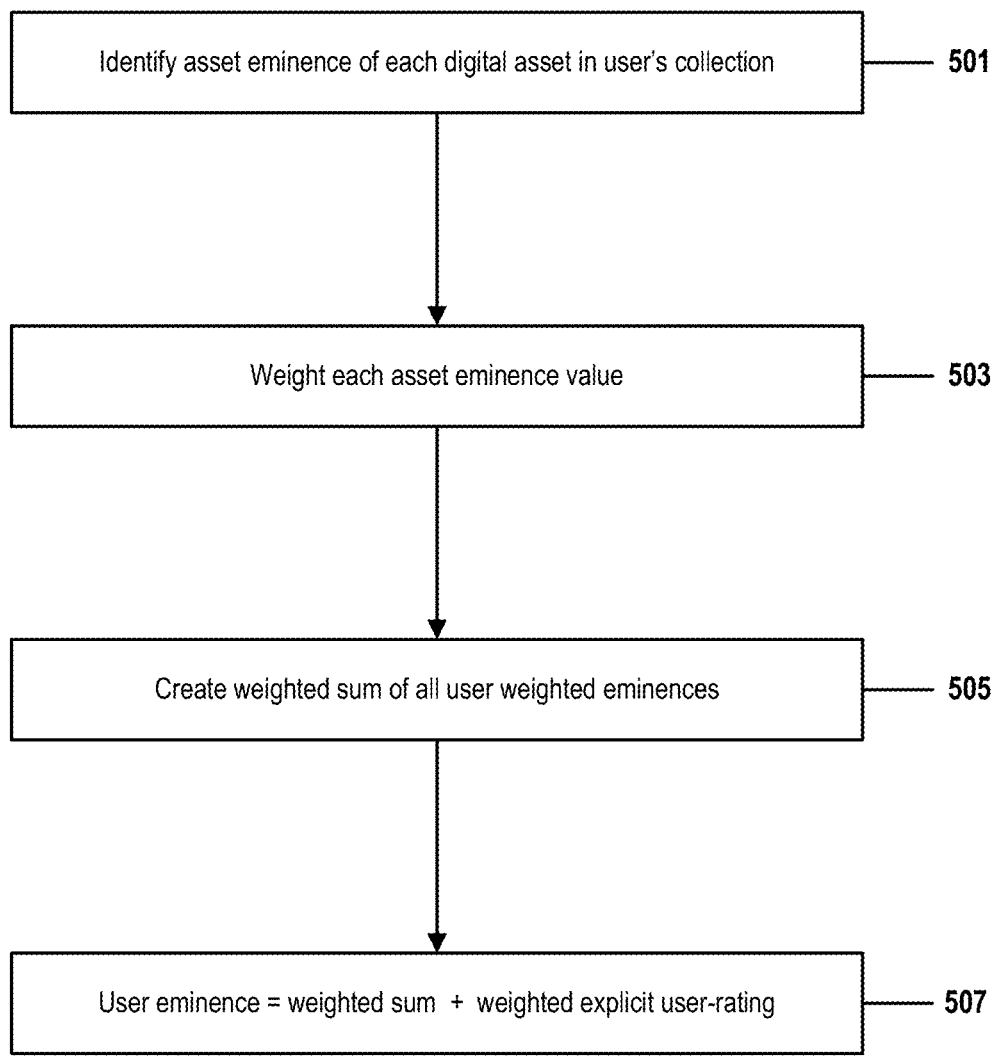
FIG. 5 is a flow chart that illustrates a method of deriving a user-eminence value in accordance with embodiments of the present invention.

FIG. 5 is a flow chart that illustrates a method of deriving a user-eminence value in accordance with embodiments of the present invention.

FIG. 5 provides greater detail to tasks described in step 213 of FIG. 2 and steps 313 and 317 of FIG. 3. In some embodiments, the one or more processors may also use the method of FIG. 5 to derive, initialize, or adjust a user-eminence value associated with a particular user when performing other tasks comprised by or related to the embodiment.

As explained above, in embodiments of the present invention described herein, one or more processors associate each user with a distinct user-eminence value specific to that user and further associate an asset-eminence value with each asset instance comprised by the user's personal collection. As with asset-eminence values, a higher user-eminence value may indicate greater prominence, status, or importance and an increase to a user's user-eminence value is thus desirable to the user.

In embodiments of the present invention, an instance that is accessed or reused more often or by a greater number of users may have a greater positive effect on a user-eminence value of a user whose personal collection contains that instance. Similarly, a user whose personal collection comprises a greater number of instances of higher-eminence assets may be associated with a higher user-eminence value. In addition, a user may be manually or automatically associated with an initial weighted or unweighted user-eminence value that is selected as a function of implementation-dependent criteria.

In step 501, the one or more processors identify an asset-eminence values E of every asset instance comprised by a personal collection of a first user P. As explained in the description of FIG. 4, each instance of a digital asset A may be associated with a corresponding asset-eminence value $E_A$, as derived by step 413 of FIG. 4. In some cases, an asset-eminence value of an asset that has not yet been reused may be identified by a function of a weighted or by an unweighted default rating.

In step 503, the one or more processors adjust each asset-eminence value identified in step 501 by multiplying the value by a weighting value specific to the asset, to the user, or to a particular instance of an asset stored in the user's personal collection. In some embodiments, this weighting may be omitted for one or more instances.

In step 505, the one or more processors add the weighted asset-eminence values generated in step 503. In one example, if the user's personal collection contains k instances of digital assets, the weighted sum might be represented as:

$$\Sigma(W_k * E_{A_k})$$

where a weighting value associated with a $k^{th}$ instance is represented as $W_k$, and where an asset-eminence value of the $k^{th}$ instance is represented as $E_{A_k}$.

In step 507, the one or more processors derive a user-eminence value $E_P$ for first user P by adjusting the weighted sum derived in step 505 with a weighted explicit user-rating. In some embodiments, the explicit user-rating may not be modified by a weighting value.

The weighted explicit user-rating apply may be expressed as a product of an unweighted explicit user-rating $R_P$ associated with the first user P and an explicit user-rating weighting factor $W_P$ of user P. In some embodiments of the present invention the one or more processors may compute, adjust, or assign values to these two elements as a function of implementation-dependent criteria, and this computation, adjustment, or assignment may be performed automatically by the one or more processors, or manually by an implementer who is skilled in the art or who possesses expert knowledge of the embodiment, its users, or the assets that it manages.

In other embodiments the unweighted explicit user-rating $R_P$ may be initially selected by one or more users (excluding user P) as a function of the one or more users' judgment of a relative importance of the user. A user may, for example, be assigned a greater explicit user-rating if the user perceives that the first is perceived to be more important, more influential, or more competent than other users. These user-ratings may be referenced by other users as search criteria when searching for specific assets in search procedures like that of step 203.

In step 507, the one or more processors thus derive a user-eminence value $E_P$ of user P as:

$$E_P = \Sigma(W_k * E_{A_k}) + (W_P * R_P)$$

$E_P$ may be expressed as an absolute value, as shown above, or may be translated to an equivalent percentile value or other equivalent representation.

What is claimed is:

1. A method for enabling digital asset reuse, the method comprising:

a processor of a computer system detecting that a first user has used a digital asset,
wherein the first user is associated with a first user-eminence value that represents a relative importance of the first user, and
wherein the digital asset is associated with an asset-eminence value that represents a relative importance of the digital asset;

the processor, in response to the detecting, automatically creating and adding a first instance of the digital asset to a first collection of digital assets for a purpose of allowing other users to identify and use the digital asset, wherein the first collection is a personal collection of the first user and is accessible by other users without requiring an action of the processor;

the processor further detecting that a second user has identified the first instance of the digital asset, that the second user has requested from the first user access to the first instance of the digital asset in response to the identifying, and that the second user has, upon receiving permission from the first user, subsequently used the first instance, wherein the second user is associated with a second user-eminence value that represents a relative importance of the second user, and;

the processor responding to the further detecting by further automatically creating and adding a second instance of the digital asset to a second collection of digital assets for a purpose of allowing other users to identify and use the digital asset, wherein the second collection is a personal collection of the second user and is accessible by other users without requiring an action of the processor;

the processor revising, as a function of the further detecting, the asset-eminence value and the first user-eminence value, but not the second user-eminence value;

the processor receiving notice that a third user has further identified the second instance of the digital asset, that the third user has requested from the second user access to the second instance of the digital asset in response to the further identifying, and that the third user has, upon receiving permission from the second user, subsequently used the second instance, wherein the third user is associated with a third user-eminence value that represents a relative importance of the third user, and;

the processor automatically creating and adding a third instance of the digital asset to a third collection of digital assets for a purpose of allowing other users to identify and use the digital asset, wherein the third collection is a personal collection of the third user and is accessible by other users without requiring an action of the processor; and the processor further revising, as a function of the receiving notice, the asset-eminence value, the first user-eminence value, and the second user-eminence value, but not the third user-eminence value.

2. The method of claim 1,
wherein revising the first user-eminence value awards a first incentive to the first user,
wherein revising the second user-eminence value awards a second incentive to the second user, and
wherein a value of the first incentive is greater than a value of the second incentive.

3. The method of claim 2,
wherein the value of the first incentive and the value of the second incentive are determined as a function of a first time at which the first instance is accessed by the second user and as a further function of a second time at which the second instance is accessed by the third user, and
wherein a difference between the value of the first incentive and the value of the second incentive is proportional to a duration of time between the first time and the second time.

4. The method of claim 1, wherein the second user identifies the first instance of the digital asset as a function of an affinity between the first user and the second user.

5. The method of claim 4, wherein the affinity is a function of the second user's self-identification as a follower of the first user.

6. The method of claim 1, wherein the digital asset is associated with metadata that describes a characteristic of the digital asset, and wherein the second user identifies the first instance of the digital asset as a function of the metadata.

7. The method of claim 1, wherein the first user is associated with a user characteristic, and wherein the second user identifies the first instance of the digital asset as a function of the user characteristic.

8. The method of claim 1, wherein the using the first instance comprises creating a new digital asset that comprises at least a portion of the digital asset.

9. The method of claim 1, wherein the first collection is stored in a cloud-computing environment.

10. The method of claim 1, wherein the first user-eminence value is a function of a weighted sum of all eminence values of all assets comprised by the first collection.

11. The method of claim 1,
wherein each instance of the digital asset is associated with a weighted eminence of a set of weighted eminence values,
wherein a particular instance of the digital asset is stored in a personal collection of a particular user and is associated with a particular weighted eminence of the set of weighted eminence values,
wherein a value of the particular weighted eminence is determined as a function of a type of an initial usage of the digital asset by the particular user, and
wherein the asset-eminence value of the digital asset is a sum of all eminence values of the set of weighted eminence values that are associated with the digital asset.

12. The method of claim 1, further comprising providing at least one support service for at least one of creating, integrating, hosting, maintaining, and deploying computer-readable program code in the computer system, wherein the computer-readable program code in combination with the computer system is configured to implement the detecting, the automatically creating and adding a first instance, the further detecting, the responding, the automatically creating and adding a second instance, the revising, the receiving notice the automatically creating and adding a third instance, and the further revising.

13. A computer program product, comprising a computer-readable hardware storage device having a computer-readable program code stored therein, said program code configured to be executed by a processor of a computer system to implement a method for enabling digital asset reuse, the method comprising:

a processor of a computer system detecting that a first user has used a digital asset,
  wherein the first user is associated with a first user-eminence value that represents a relative importance of the first user, and
  wherein the digital asset is associated with an asset-eminence value that represents a relative importance of the digital asset;
the processor, in response to the detecting, automatically creating and adding a first instance of the digital asset to a first collection of digital assets for a purpose of allowing other users to identify and use the digital asset, wherein the first collection is a personal collection of the first user and is accessible by other users without requiring an action of the processor;
the processor further detecting that a second user has identified the first instance of the digital asset, that the second user has requested from the first user access to the first instance of the digital asset in response to the identifying, and that the second user has, upon receiving permission from the first user, subsequently used the first instance, wherein the second user is associated with a second user-eminence value that represents a relative importance of the second user, and;
the processor responding to the further detecting by further automatically creating and adding a second instance of the digital asset to a second collection of digital assets for a purpose of allowing other users to identify and use the digital asset, wherein the second collection is a personal collection of the second user and is accessible by other users without requiring an action of the processor;
the processor revising, as a function of the further detecting, the asset-eminence value and the first user-eminence value, but not the second user-eminence value;
the processor receiving notice that a third user has further identified the second instance of the digital asset, that the third user has requested from the second user access to the second instance of the digital asset in response to the further identifying, and that the third user has, upon receiving permission from the second user, subsequently used the second instance, wherein the third user is associated with a third user-eminence value that represents a relative importance of the third user, and;
the processor automatically creating and adding a third instance of the digital asset to a third collection of digital assets for a purpose of allowing other users to identify and use the digital asset, wherein the third collection is a personal collection of the third user and is accessible by other users without requiring an action of the processor; and
the processor further revising, as a function of the receiving notice, the asset-eminence value, the first user-eminence value, and the second user-eminence value, but not the third user-eminence value.

14. The computer program product of claim 13,
wherein revising the first user-eminence value awards a first incentive to the first user,
wherein revising the second user-eminence value awards a second incentive to the second user,
wherein a value of the first incentive is greater than a value of the second incentive,
wherein the value of the first incentive and the value of the second incentive are determined as a function of a first time at which the first instance is accessed by the second user and as a further function of a second time at which the second instance is accessed by the third user, and
wherein a difference between the value of the first incentive and the value of the second incentive is proportional to a duration of time between the first time and the second time.

15. The computer program product of claim 13,
wherein each instance of the digital asset is associated with a weighted eminence of a set of weighted eminence values,
wherein a particular instance of the digital asset is stored in a personal collection of a particular user and is associated with a particular weighted eminence of the set of weighted eminence values,
wherein a value of the particular weighted eminence is determined as a function of a type of an initial usage of the digital asset by the particular user, and
wherein the asset-eminence value of the digital asset is a sum of all eminence values of the set of weighted eminence values that are associated with the digital asset.

16. A computer system comprising a processor, a memory coupled to said processor, and a computer-readable hardware storage device coupled to said processor, said storage device containing program code configured to be run by said processor via the memory to implement a method for enabling digital asset reuse, the method comprising:
the processor detecting that a first user has used a digital asset,
  wherein the first user is associated with a first user-eminence value that represents a relative importance of the first user, and
  wherein the digital asset is associated with an asset-eminence value that represents a relative importance of the digital asset;
the processor, in response to the detecting, automatically creating and adding a first instance of the digital asset to a first collection of digital assets for a purpose of allowing other users to identify and use the digital asset, wherein the first collection is a personal collection of the first user and is accessible by other users without requiring an action of the processor;
the processor further detecting that a second user has identified the first instance of the digital asset, that the second user has requested from the first user access to the first instance of the digital asset in response to the identifying, and that the second user has, upon receiving permission from the first user, subsequently used the first instance, wherein the second user is associated with a second user-eminence value that represents a relative importance of the second user, and;
the processor responding to the further detecting by further automatically creating and adding a second instance of the digital asset to a second collection of digital assets for a purpose of allowing other users to identify and use the digital asset, wherein the second collection is a personal collection of the second user and is accessible by other users without requiring an action of the processor;
the processor revising, as a function of the further detecting, the asset-eminence value and the first user-eminence value, but not the second user-eminence value;
the processor receiving notice that a third user has further identified the second instance of the digital asset, that the third user has requested from the second user access to the second instance of the digital asset in response to the further identifying, and that the third user has, upon receiving permission from the second user, subsequently used the second instance, wherein the third user is associated with a third user-eminence value that represents a relative importance of the third user, and;

the processor automatically creating and adding a third instance of the digital asset to a third collection of digital assets for a purpose of allowing other users to identify and use the digital asset, wherein the third collection is a personal collection of the third user and is accessible by other users without requiring an action of the processor; and the processor further revising, as a function of the receiving notice, the asset-eminence value, the first user-eminence value, and the second user-eminence value, but not the third user-eminence value.

17. The computer system of claim 16, wherein each instance of the digital asset is associated with a weighted eminence of a set of weighted eminence values, wherein a particular instance of the digital asset is stored in a personal collection of a particular user and is associated with a particular weighted eminence of the set of weighted eminence values, wherein a value of the particular weighted eminence is determined as a function of a type of an initial usage of the digital asset by the particular user, and wherein the asset-eminence value of the digital asset is a sum of all eminence values of the set of weighted eminence values that are associated with the digital asset.

* * * * *